United States Patent Office 2,790,816  
Patented Apr. 30, 1957

2,790,816

ORGANIC MERCURY COMPOUNDS

Lincoln H. Werner, Summit, N. J., and Caesar R. Scholz, Basel, Switzerland, assignors to Ciba Pharmaceutical Products, Inc., Summit, N. J.

No Drawing. Application June 10, 1953,  
Serial No. 360,811

6 Claims. (Cl. 260—431)

This invention relates to organic mercury compounds.

It is a primary object of the invention to provide a new type of organic mercury compound corresponding to the structure:

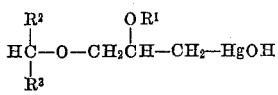

wherein $R^1$ stands for hydrogen, lower alkyl (e. g. methyl), lower hydroxyalkyl (e. g. hydroxyethyl) or acetyl, $R^2$ stands for hydrogen, 2,2-dimethyldioxolanyl-(4)—, —(CHOH)$_{n-1}$.CH$_2$OH or —(CHOH)$_{n-1}$.CHO, and $R^3$ stands for hydrogen, 2,2-dimethyldioxolanyl-(4)— or —(CHOH)$_{n-1}$.CH$_2$OH, $n$ being a whole number from 1 to 5, with the proviso that only one but not both of $R^2$ and $R^3$ may, in any compound within the scope of this invention, be hydrogen. The invention extends also to salts of the said compounds with acids, and to compounds wherein hydroxyl groups in $R^2$ and $R^3$ are protected as by ester, acetal or ketal groups.

The thus-described compounds of this invention are produced conveniently by mercurating the mono-allyl ether of the corresponding polyol. The mercurating reaction is carried out with the aid of a mercuric salt such as mercuric acetate, mercuric benzoate, or mercuric tartrate in a suitable solvent; mercuric chloride, or mercuric nitrate in a suitable solvent with occasional additions of alkali to maintain turbidity caused by precipitation of mercuric oxide; or with the aid of mercuric oxide in a suitable solvent containing one equivalent of an acid such as acetic, benzoic, tartaric, nitric and the like. The reaction product is recovered from the reaction solution by precipitation or by evaporating the solution to dryness, or by drying from the frozen state. The products are amorphous solids, some of which are hygroscopic.

Suitable polyol compounds from which the allyl ethers are derived are selected, for example, from carbohydrates, more particularly the aldoses, ketoses, the alcohols formed by reduction of the carbonyl group present in aldoses and ketoses, and derivatives of such wherein the hydroxyl radicals are protected by ester, acetal or ketal groups and the like. Examples of suitable allyl-polyol ethers are allyl ethers derived from glycerol, glucose, xylitol, mannitol, sorbitol and the like or a polyol wherein hydroxyls on the carbons of the polyol adjacent to the ether-bearing carbon are protected as, for example, 1,2-isopropylidene glycerol, 1,2;4,5-diisopropylidene xylitol, 1,2;5,6-diisopropylidene glucose, or by ester groups such as in diacetyl glycerol, pentaacetyl mannitol and the like.

The choice of the solvent in which to carry out the mercuration depends upon the starting material and the mercurated product to be produced. When $R^1$ is alkyl, the solvent chosen is the alcohol $R^1OH$. Products in which $R^1$ is hydrogen are best produced by mercurating an allyl-polyol ether in which hydroxyl radicals on the carbon atoms of the polyol adjacent to the carbon bearing the ether linkage are protected by ester, acetal or ketal groups in a solvent such as aqueous dioxane, aqueous glycol dimethyl ether, aqueous acetone and the like, followed, if desired, by removal of the protecting groups. Mercuration in aqueous medium of an allyl-polyol ether in which the hydroxyls are not protected leads to the formation of the products having a dioxane structure

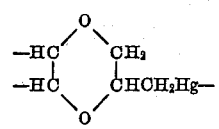

which are the subject of our copending application Serial No. 360,812, filed June 10, 1953.

The products of the present invention have utility as germicides and as diuretics and are especially useful as the starting point for the preparation of a large number of other organic mercurials which are especially useful as diuretics.

In the following examples, the invention is illustrated in greater detail with reference to exemplary representative embodiments thereof. It is to be understood, however, that these examples are presented solely by way of illustration and not by way of limitation. In the examples, parts by weight bear the same relation to parts by volume as do grams to milliliters. Temperatures are expressed in degrees centigrade.

Example 1

17.2 parts by weight of 1-allyloxy-2,3-isopropylidene-glycerol (prepared according to R. M. Evans and L. N. Owen, J. C. S. 1949, p. 244) is dissolved in 50 parts by volume of methanol. A solution of 31.9 parts by weight of mercuric acetate in 350 parts by volume of methanol is added slowly with stirring. The reaction mixture is allowed to stand overnight, a sample tested for free mercury ion by making alkaline and, in the absence of excess of free mercury ion, the reaction mixture evaporated to dryness. The product is dissolved in anhydrous ethanol, the solution filtered and then evaporated to dryness again. 1 - (3 - acetoxymercuri - 2 - methoxypropoxyl)-2,3-isoproplylidene-glycerol is obtained of the following structure

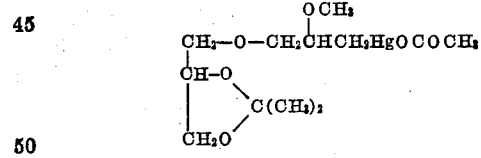

9.25 parts by weight of this compound is dissolved in 140 parts by volume of 50% aqueous acetic acid and warmed to 60° for 2 hours. The reaction mixture is then evaporated to dryness, the product is dissolved in anhydrous ethanol, and again evaporated to dryness. 1-(2-methoxy-3-acetoxymercuripropyl)-glycerol is obtained as a colorless highly viscous oil. It corresponds to the formula

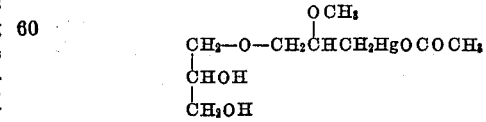

Example 2

17.2 parts by weight of 1-allyloxy-2,3-isopropylidene-glycerol is dissolved in 50 parts by volume of water and 50 parts by volume of dioxane. A solution of 31.8 parts by weight of mercuric acetate in 100 parts by volume of water is added while stirring. The reaction mixture is allowed to stand overnight at room temperature, a sample tested for free mercury ion by making alkaline and, in the absence of free mercury ion, the reaction mixture evaporated to dryness. The product is dissolved in anhydrous ethanol, the solution filtered and evaporated to dryness to yield the syrupy product, 1-(3-acetoxymercuri-2-hydroxypropoxyl)-2,3-isopropylidene-glycerol corresponding to the structure

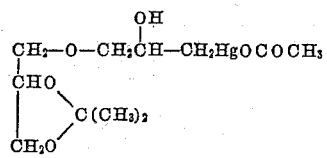

An aqueous solution of 5 parts by weight of the above product is made slightly alkaline with sodium hydroxide and the mixture extracted with chloroform. The chloroform extract is washed with water and evaporated to dryness to yield 4-(3-hydroxymercuri-2-hydroxypropoxymethyl)-2,2-dimethyl-1,3-dioxolane.

9.0 parts by weight of 4-(3-acetoxymercuri-2-hydroxypropoxymethyl)-2,2-dimethyl-1,3-dioxolane is dissolved in 135 parts by volume of 50% aqueous acetic acid and warmed to 60° for 2 hours. The reaction mixture is then evaporated to dryness, the residue taken up in absolute ethanol and again evaporated to dryness to yield 1-(2 - hydroxy - 3 - acetoxymercuripropyl) - glycerol as a colorless highly viscous oil corresponding to the formula

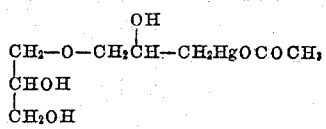

*Example 3*

20 parts by weight of 1,2;4,5-diisopropylidene-xylitol (prepared for instance according to the method of R. S. Tipson and L. H. Cretcher, J. O. C. 8: 95 (1943) is dissolved in 20 parts by volume of water and 85 parts by volume of acetone. The resultant solution is made alkaline with 32 parts by weight of sodium hydroxide in 32 parts by volume of water, and to the thus-obtained solution are added 16.6 parts by weight of allyl bromide dissolved in 25 parts by volume of acetone. The allyl bromide solution is added dropwise with stirring over a period of 3 hours at 75°. The acetone is then removed by distillation, the residue diluted with 200 parts by volume of water, and the aqueous solution neutralized partially with 16 parts by volume of concentrated sulfuric acid in 50 parts by volume of water. The resulting solution is extracted four times with ether, each time with 100 parts by volume, and the combined extracts dried over anhydrous potassium carbonate and then evaporated to dryness. The residue is distilled under reduced pressure, boiling at 94–96° at 0.05 mm. pressure.

5.5 parts by weight of 3-allyl-1,2;4,5-diisopropylidene xylitol is dissolved in 50 parts by volume of dioxane. A solution of 6.36 parts by weight of mercuric acetate and 50 parts by volume of water is added while stirring. The reaction mixture is allowed to stand for 16 hours, tested for free mercury ion as described in Example 1 and then evaporated to dryness in vacuo. The residue is taken up in absolute ethanol, the solution filtered, and evaporated to dryness in vacuo to yield 3-(3-acetoxymercuri-2-hydroxypropyl)-1,2;4,5-diisopropylidene-D-xylitol as a syrup corresponding to the formula

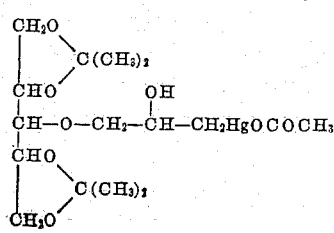

10 parts by weight of the latter are warmed for 2 hours at 60° with 150 parts by volume of 50% aqueous acetic acid. The solution is then evaporated to dryness, the residue taken up in absolute ethanol and again evaporated to dryness to yield 3-(3-acetoxymercuri-2-hydroxypropyl)-D-xylitol as a syrup corresponding to the formula

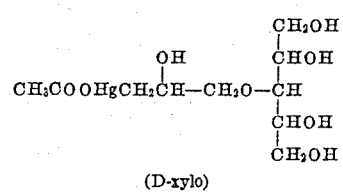

(D-xylo)

*Example 4*

2.2 parts by weight of 3-allyl-glucose (prepared from 3-allyl-1,2;4,5-diisopropylidene glucose by refluxing for 4 hours with 4% sulfuric acid, then neutralized with barium carbonate. The mixture is filtered, evaporated to dryness, the residue dissolved in ethanol and evaporated to dryness and recrystallized from ethanol-ethyl acetate; M. P. 133–136°), are dissolved in 10 parts by weight of methanol, and to the resultant solution there is then added a solution of 3.18 parts by weight of mercuric acetate in 50 parts by weight of methanol. The reaction mixture is allowed to stand for 16 hours, whereupon it is concentrated to a thick syrup under reduced pressure. The syrup is triturated with acetone and is then dried under reduced pressure. The thus-obtained amorphous solid corresponds to the formula

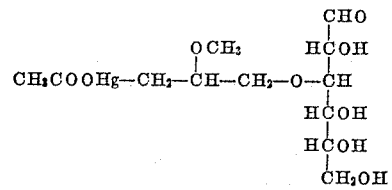

By substituting an equivalent quantity of ethanol or propanol for the methanol in the preceding paragraph, the corresponding ethoxy and propoxy derivatives are obtained.

*Example 5*

22.6 parts by weight of 1,2;5,6-diisopropylidene glucose (prepared according to Bell, J. C. S. 1935, page 1874) are dissolved in 20 parts by volume of water and 85 parts by volume of acetone. A solution of 32 parts by weight of sodium hydroxide and 32 parts by volume of water is added, followed by 15.1 parts by weight of allyl bromide in 20 parts by volume of acetone, the addition of the allyl bromide solution being extended over a period of 3 hours and at 75° while stirring. The reaction mixture is then worked up as described in Example 3, to give 3-allyl-1,2;5,6-diacetone glucose as a syrupy product, boiling point 130° at 0.4 mm. pressure.

6.1 parts by weight of 3-allyl-1,2;5,6-diisopropylidene glucose is dissolved in 20 parts by volume of methanol, a solution of 6.4 parts by weight of mercuric acetate in 70 parts by volume of methanol is added with stirring. After standing for 16 hours at room temperature, the solution is tested for free mercury ion as described in Example 1, filtered and evaporated to dryness in vacuo. The residue is taken up in absolute ethanol, and again evaporated to dryness in vacuo. 3 - (3 - acetoxymercuri-2-methoxypropyl)-1,2;5,6-diisopropylidene glucose is obtained thus as a highly viscous syrup corresponding to the formula

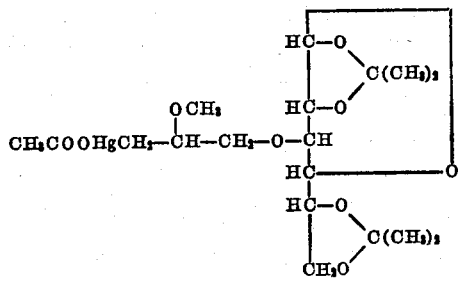

10 parts by weight of the latter product is warmed to 60° with 150 parts by volume of 50% aqueous acetic acid for 3 hours. The solution is then concentrated in vacuo to a highly viscous syrup, taken up in absolute ethanol and again concentrated in vacuo to yield 3-(3-acetoxymercuri-2-methoxypropyl) glucose as a syrup corresponding to the formula

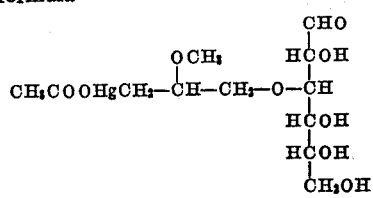

*Example 6*

6.1 parts by weight of 3-allyl-1,2;5,6-diisopropylidene glucose is dissolved in 50 parts by volume of dioxane. A solution of 6.4 parts by weight of mercuric acetate in 20 parts by volume of water is added while stirring. After standing for 16 hours at room temperature, the solution is tested for free mercury ion as in Example 1, filtered and concentrated in vacuo. The residue is taken up in absolute ethanol, filtered and evaporated in vacuo to yield 3 - (3 - acetoxymercuri-2-hydroxypropyl) - 1,2;5,6-diisopropylidene glucose as a highly viscous syrup corresponding to the formula

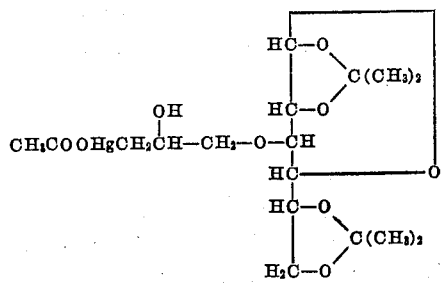

10 parts by weight of the latter product are warmed with 150 parts by volume of 50% aqueous acetic acid at 60° for 3 hours, the solution concentrated to a thick syrup in vacuo, the residue taken up in absolute ethanol and again evaporated to dryness in vacuo to yield 3-(3-acetoxymercuri-2-hydroxypropyl) glucose as a thick syrup corresponding to the formula

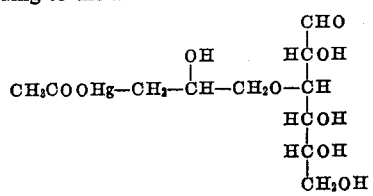

*Example 7*

9.4 parts by weight of 6-allylsorbitol (prepared according to Bladon and Owen, J. C. S. 1950, page 591) is dissolved in 25 parts by volume of methanol, and a solution of 13.45 parts by weight of mercuric acetate in 150 parts by volume of methanol added. After standing overnight, the solution is tested for the presence of free mercury ion as in Example 1, filtered and evaporated to dryness. The residue is taken up in absolute ethanol and again evaporated to dryness to yield 6-(2-methoxy-3-acetoxymercuripropyl) sorbitol as a syrup corresponding to the formula

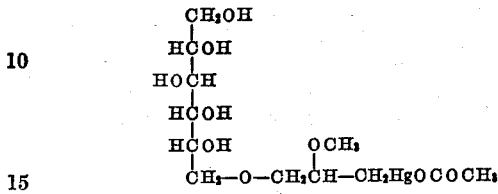

*Example 8*

2.2 parts by weight of 3-allyl mannitol are dissolved in 10 parts by weight of methanol, a solution of 3.18 parts by weight of mercuric acetate in 50 parts by weight of methanol is added, and the thus-prepared reaction mixture is allowed to stand at room temperature (20–30°) for 16 hours. The solution is then concentrated under reduced pressure, and the residue triturated with acetone and dried under reduced pressure to yield a highly viscous syrup which corresponds to the formula

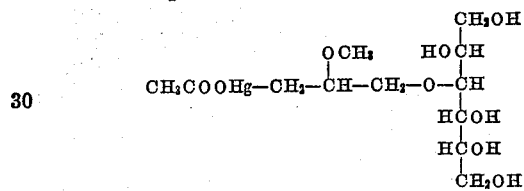

*Example 9*

2.22 parts by weight of 3-allyl mannitol are dissolved in 15 parts by volume of ethylene glycol. A solution of 3.18 parts by weight of mercuric acetate in 25 parts by volume of ethylene glycol is added. The reaction mixture is allowed to stand overnight at room temperature (20–30°), and is then concentrated in vacuo (bath temperature 100–110°). The residue is dissolved in 5 parts by volume of methanol. The product—3-[2-(β-hydroxyethoxy)-3-acetoxymercuripropyl]-d-mannitol—is precipitated by addition to 30 parts by volume of acetone, triturated with acetone, and dried in vacuo whereupon it is obtained as a very hygroscopic solid having the formula

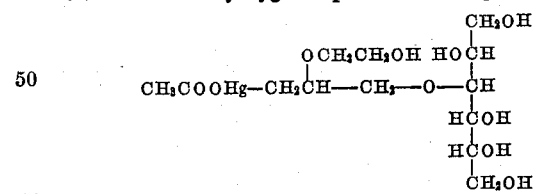

(D-manno)

*Example 10*

2.22 parts by weight of 3-allyl mannitol are suspended in 25 parts by volume of glacial acetic acid. 3.18 parts by weight of mercuric acetate are added. On stirring and gently warming the reaction mixture, complete dissolution takes place. After standing for 16 hours at room temperature (20–30°), the solution is concentrated in vacuo. The residue is triturated repeatedly with ethyl acetate and dried in vacuo to a syrupy product having the formula

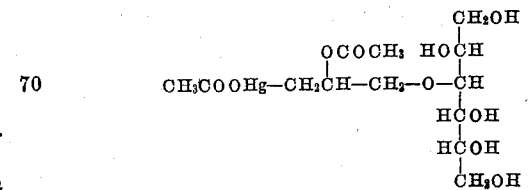

(D-manno)

Example 11

0.55 part by weight of 3-allyl mannitol is dissolved in 10 parts by volume of methanol to which is added 1.1 parts by weight of mercuric benzoate. On shaking, the mercuric benzoate slowly dissolves and the mixture is allowed to stand for 12 hours. The mixture is tested for free mercury ion as in Example 1 and then evaporated to dryness. The residue is taken up in water, extracted with ether to remove benzoic acid, filtered and is partially concentrated in vacuo, and the product precipitated by adding acetone. It is washed with acetone and dried in vacuo to yield an amorphous solid of the formula

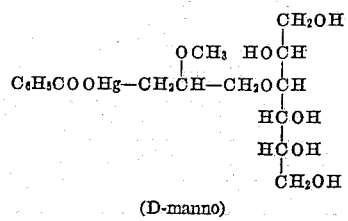

(D-manno)

Example 12

1.11 parts by weight of 3-allyl mannitol is dissolved in 15 parts by volume of methanol to which are added 1.08 parts by weight of mercuric oxide and 0.75 part by weight of d-tartaric acid. The mixture is refluxed for 1 hour whereupon the mercuric oxide slowly goes into solution. The solution is filtered and the filtrate concentrated in vacuo. 30 parts by volume of acetone is added. A voluminous precipitate forms which is filtered off, washed with acetone and dried in vacuo. 3-(2-methoxy-3-tartaroxy-mercuripropyl)-mannitol is thus obtained as a white powder which is somewhat hygroscopic, very soluble in water and corresponds to the formula

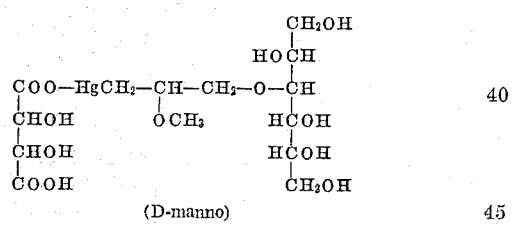

(D-manno)

The application is a continuation-in-part of our application Serial No. 248,862, filed on September 28, 1951, now abandoned.

What is claimed is:

1. A member selected from the group consisting of compounds which correspond to the formula

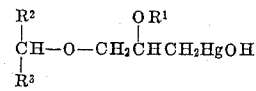

and non-toxic salts thereof, wherein $R^1$ stands for a member selected from the group consisting of hydrogen, lower alkyl, lower hydroxyalkyl and acetyl, $R^2$ stands for a member selected from the group consisting of hydrogen, 2,2-dimethyldioxolanyl-(4)—, —$(CHOH)_{n-1}CH_2OH$ and —$(CHOH)_{n-1}CHO$, and $R^3$ stands for a member selected from the group consisting of hydrogen, 2,2-dimethyldioxolanyl-(4)—, and —$(CHOH)_{n-1}CH_2OH$, $n$ being a whole number from 1 to 5, the CHO group being the terminal group of the polyol chain, and the total number of carbon atoms in $R^2$—C—$R^3$ being from 3 to 12.

2. The compound of the formula

3. The compound of the formula

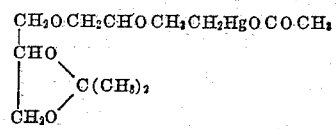

4. The compound of the formula

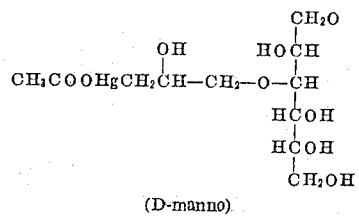

(D-manno)

5. The compound of the formula

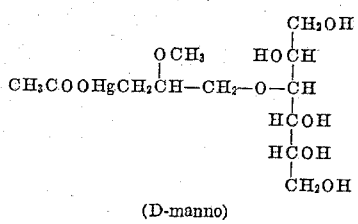

(D-manno)

6. The compound of the formula

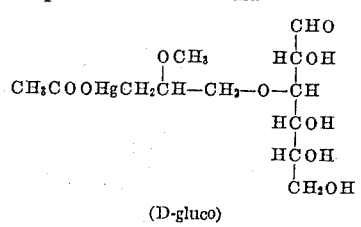

(D-gluco)

References Cited in the file of this patent

Shukis et al.: J. A. S., v. 65, p. 2365–6, December 1943. (Copy in Patent Office Library.)